United States Patent [19]

Garrett et al.

[11] Patent Number: 4,749,063

[45] Date of Patent: Jun. 7, 1988

[54] BRAKE CLEARANCE SENSING AND CONTROL SYSTEM

[75] Inventors: Wayne H. Garrett, Troy, Mich.; Lawrence J. Kamm, San Diego, Calif.

[73] Assignee: Eaton Corporation, Cleveland, Ohio

[21] Appl. No.: 27,284

[22] Filed: Mar. 17, 1987

[51] Int. Cl.$^4$ ............... F16D 66/00; F16D 51/00
[52] U.S. Cl. ............... 188/1.11; 188/79.51; 188/79.53
[58] Field of Search ............... 188/1.11, 71.7, 71.9, 188/79.5 R, 79.5 M, 79.5 GT, 196 R, 196 BA, 198, 202, 203; 192/111 A

[56] References Cited

U.S. PATENT DOCUMENTS

| 2,551,888 | 5/1951 | Learn | 188/79.5 |
| 4,345,672 | 8/1982 | Nakasu | 188/1.11 |
| 4,381,049 | 4/1983 | Crossman | 188/71.9 X |
| 4,499,976 | 2/1985 | Weber | 188/71.9 |

FOREIGN PATENT DOCUMENTS

| 0594367 | 2/1978 | U.S.S.R. | 192/111 |
| 0721612 | 2/1980 | U.S.S.R. | 188/1.11 |

Primary Examiner—Douglas C. Butler
Assistant Examiner—Timothy Newholm
Attorney, Agent, or Firm—A. E. Chrow

[57] ABSTRACT

A brake clearance sensing and control system (60) is provided for controlling brake released clearance (c) between a frictional braking member (6) and a rotary brake surface (15). System (60) includes an air flow rate sensor (18) operative to provide a signal (26) indicative of air flow rate through conduit (4) between a pressurized air source (2) and a gap (16) between frictional member (6) and rotary brake surface (15) that is a function of clearance (c) and which creates a variable air flow restriction. System (60) preferably includes a pulse control (20) operative to cause pressurized air to flow through conduit (4) only in the brake released condition and signal (26) is operative to either or both provide a warning signal (32) when clearance (c) has exceeded a predetermined maximum and to enable an adjusting mechanism to adjust clearance (c) to a desired predetermined clearance in the brake released condition.

11 Claims, 1 Drawing Sheet

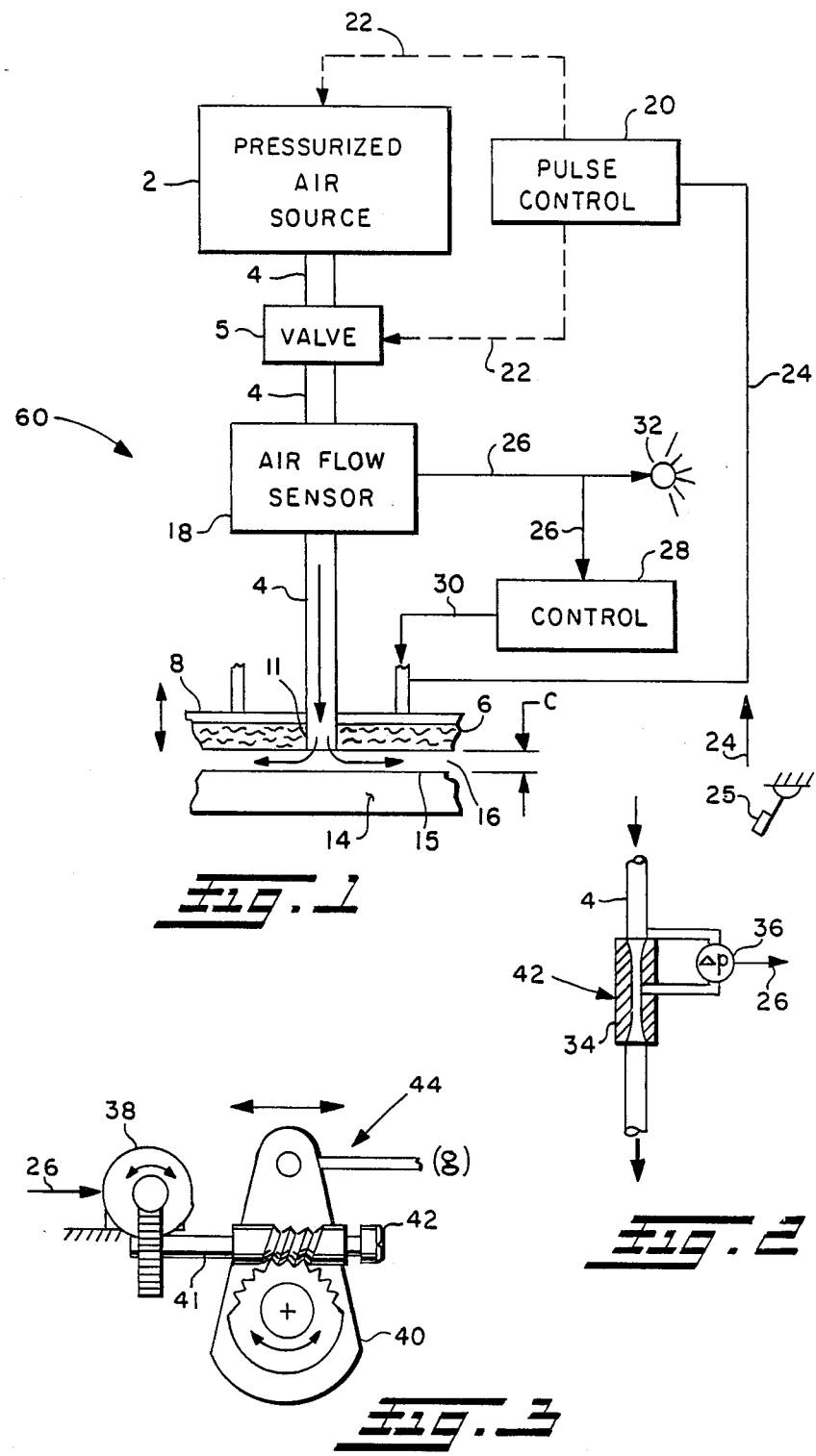

BRAKE CLEARANCE SENSING AND CONTROL SYSTEM

INTRODUCTION

This invention relates generally to a system for sensing and preferably for both sensing and controlling brake clearance in a brake disengaged condition and more particularly to such system that operates by pressurized air and is particularly advantageous for use in vehicular brake applications.

BACKGROUND OF THE INVENTION

The present invention relates to brakes, particularly vehicular wheel brakes, that feature a rotary brake surface such as a wheel drum and a frictional braking member such as a shoe and lining assembly that is operative to be moved, preferably by an air actuated cam mechanism, against the rotary brake surface and frictionally retard and ultimately stop the rotary brake surface from rotating in a brake applied condition and to disengage and move away from the rotary brake surface in a brake disengaged condition such as when a vehicle operator steps upon and then releases a brake pedal.

Generally, there is an initially established desired clearance between the rotary brake surface and the frictional braking member when the braking system is new or newly repaired. However, due to wear of the frictional braking member over a period of time, the initial clearance is caused to increase resulting in a greater distance for the frictional braking member to travel before it engages the rotary brake surface. In other instances, heat may cause either or both the rotary brake surface and frictional braking member to swell and expand towards each other and thus reduce the clearance from the initially established clearance therebetween in the brake disengaged condition. Likewise, cold temperatures may cause either or both the rotary brake surface and frictional braking member to contract resulting in an increase in the clearance therebetween from the initially established clearance in the brake disengaged or released condition.

Thus, for a variety of reasons, the clearance between a rotary brake surface and a frictional braking member is undesirably apt to change from that originally established.

In view of the above, a need exists to simply and economically sense changes in the brake clearance from the initial clearance desired and preferably automatically adjust the clearance sensed to the initial clearance desired.

The present invention solves the problem in a novel way by utilizing pressurized air to sense the brake clearance in a simple and effective manner and provide a signal indicative thereof which preferably is utilized by a brake clearance adjusting device to automatically adjust the brake clearance to the initial clearance desired in the brake disengaged condition which is particularly advantageous for vehicles driven by engines and equipped with an on-board source of pressurized air driven by the engine.

SUMMARY OF THE INVENTION

Accordingly, it is an object of this invention to provide a system for sensing and providing a signal indicative of brake clearance in a brake disengaged condition.

It is another object of this invention to provide a brake clearance sensing and control system operative to automatically adjust brake clearance to an initially desired clearance in the brake disengaged condition.

It is still another object of this invention to provide an economical and simple brake clearance sensing system that operates by pressurized air to provide a signal indicative of brake clearance in a brake disengaged condition and is preferably further operable to utilize the signal for automatically adjusting the clearance to an initially desired clearance.

BRIEF DESCRIPTION OF THE DRAWINGS

FIG. 1 shows a block diagram of an embodiment 60 of the brake clearance sensing and control system of the invention;

FIG. 2 shows a partial view of an example of an air flow sensor for use in the system of FIG. 1; and FIG. 3 shows a partial end view of an example of a control member for use in the system of FIG. 1.

DESCRIPTION OF SOME PREFERRED EMBODIMENTS

In FIG. 1, brake clearance sensing and control system 60 includes a pressurized gas source 2 such as an air compressor driven by a vehicular engine. Although referred to hereinafter as air, it is to be understood that pressurized gases other than air may be used in the sensing and control system but, in most instances, air would be the most economical and readily available from compressors, particularly those driven by vehicular engines and, as such, the term "air" as used herein shall mean all pressurized gases capable of operating in the manner hereinafter described with respect to air for sensing brake clearance.

Generally, source 2 is operable to provide pressurized air at least for the periods in which the air flow derived therefrom is being monitored in the brake released condition. Source 2 may, for example, be an air compressor driven by a vehicular engine or it may be a pressurized air tank which is used to provide braking air pressure.

Preferably, source 2 is a substantially constant pressurized air source. In instances where it is not available within a desired pressure range, a suitable pressure regulator can be used to regulate the source pressure to within the range desired or the air flow sensor can be adapted to operate within prescribed limits falling outside of the source pressure range.

Preferably, the pressurized air is conveyed from source 2 through conduits 4 through an opening 11 through a frictional braking member which typically comprises a frictional brake lining 6 mounted on a support such as a brake shoe generally referred to by numeral 8.

Brake shoe 8 including frictional braking member 6 is mounted in a suitable manner to move towards and frictionally engage rotary brake surface 15 when the brake is applied and to disengage and move in an opposite direction when the brake is released.

Rotary brake surface 15 is the surface that frictional braking member 6 moves against and frictionally retards rotation relative thereto when the brakes are applied. For vehicular applications, surface 15 is a brake surface of a member 14 such as a conventional brake drum or a disc plate depending upon which type of brake is being used. Brake shoe 8 is adapted to be moved in opposite directions without being inhibited by conduit 4 such as by conduit 4 being a flexible conduit or telescopically designed.

Alternatively, the pressurized air may be conveyed through a conduit having an outlet positioned to direct the pressurized air flow between rotary brake surface 15 and frictional braking member 6 and which may be mounted either to move with brake shoe 8 or is secured against movement relative thereto.

A pulse control 20 is preferably utilized to cause the pressurized air to flow through conduit 4 from source 2 only when the brake is released. Although a continuous flow of pressurized air through conduit 4 may be utilized by the system of the invention, periodic flow is preferred for conservation purposes. Pulse control 20 is operable to receive a signal 24 from moveable member 8 or from brake pedal 25 when the brake is released and to control air flow by providing signal 22 either to the input side of source 2, for example, to connect or disconnect source 2 from a drive source or on the output side of source 2 such as by opening and closing a valve 5 in conduit 4.

An air flow sensor member 18 is located intermediate source 2 and members 6 and 8 and operable to monitor air flowing through conduit 4. Sensor member 18 may be any device operable to monitor pressurized air flow such as, for example, by air flow monitor 42 in FIG. 2 which monitors differential pressure 36 across a venturi tube 34 through which the pressurized air is flowing. Member 42 is operable to provide a differential air pressure ($\Delta p$) signal 26 indicative of air flowing through conduit 4 when the brake is released. Signal 26 will vary according to respective variances in pressurized air flow through conduit 4. Generally, a decreasing restriction along the air flow path such as, for example, by opening a valve will enable the air flow rate to increase which in turn causes the ($\Delta p$) signal 26 to increase and any increasing restriction along the air flow path such as, for example, closing a valve, will cause the air flow rate to decrease which in turn will cause the ($\Delta p$) signal 26 to decrease.

Gap 16 between frictional braking member 6 and brake surface 15 is a path through which the air must flow as shown by the arrows and represents a variable restriction to air flow that changes according changes to clearance c therebetween. Thus, as earlier described, wear of frictional member 6 may cause gap 16 and clearance c to increase and heating or cooling may cause gap 16 and clearance c to correspondly decrease and increase in the brake released condition. Such changes in gap 16 will correspondly cause change as in air flow rate that can be sensed by sensor member 18.

Air flow sensor member 18 is operable to provide a signal 26 indicative of changes in air flow resulting from changes in gap 16 which can easily be calibrated to render signal 26 indicative of clearance c.

Optionally, a separate conduit such as the conduit previously described may be included for conveying pressurized air into gap 16 from sensor 18 which is operative to actuate a warning device such as light 32 when lining 6 is worn to the point that clearance c exceeds a predetermined amount.

System 60 may be utilized to only sense air flow through gap 16 in the brake released condition and provide a signal 26 indicative thereof to actuate a warning such as warning light 32 for example on the dashboard of a vehicle for warning when clearance c exceeds a predetermined maximum value and/or falls below a predetermined minimum value.

System 60, however, preferably includes a control 28 which is operative to receive signal 26 and which is operably connected to the movable frictional braking member by means generally referenced as 30 and operative to adjust clearance c to an initial predetermined desired clearance in the brake released condition.

One example of a control member operative to adjust clearance c is shown as member 44 in FIG. 3. Member 44 includes a reversible motor 38 operative to receive signal 26 and rotate in opposite directions according to the value of signal 26. Motor 38 receives signal 26 and is operative to rotate slack arm 40 commonly through an intermediate gear train generally referenced by numeral 41 in a direction causing slack arm 40 to move brake shoe 8 including frictional braking member 6 in a direction for a distance sufficient to restore the initial predetermined desired clearance in the brake released condition. Gear train 41 may include means such as adjusting nut 42 to manually adjust brake clearance when such is desired.

Signal 26 may be a fluid signal such as an air signal where motor 38 is a reversible air motor or it may be an electrical signal where motor 38 is a reversible electrical motor.

Control member 44 may be any control device or system operative to adjust clearance c to a predetermined initially desired clearance between rotary brake surface 15 and frictional braking member 6 by either rotary movement such as shown in FIG. 3 or by linear movement such as provided by an air cylinder piston.

Air flow sensing such as for example provided by sensor 42 in FIG. 2 can be readily calibrated to provide a signal indicative of clearance c in the brake released condition which in turn can be used to either or both provide a warning or cause a control to automatically adjust the clearance to that initially desired between a frictional braking member and a rotary brake surface.

The system of the invention can be employed on vehicles to sense wheel brake clearance on more than one brake at a time such as, for example, by utilizing a single pressurized fluid source and pulse control and monitoring and/or controlling brake clearance of each of the individual brakes in the brake disengaged condition.

What is claimed is:

1. An improved system for sensing and providing a signal indicative of clearance between a rotary brake surface and a frictional braking member that in a brake released condition is operative to move against and frictionally retard the rotary brake surface from rotation relative thereto in a brake applied condition, said system comprising:

a source of pressurized air, conduit means operative to convey the pressurized air therethrough and into an air gap between the rotary brake surface and the frictional braking member defining an air flow restriction that is a function of the clearance therebetween, and an air flow sensor member operative to monitor rate of pressurized air flowing through the conduit means and calibrated to provide a signal indicative of the clearance between the rotary brake surface and the friction braking member in the brake released condition as a function of said gap restriction, said improvement characterized by said system including pulse control means operative to cause pressurized air to flow through the conduit means only in the brake released condition.

2. An improved system for controlling clearance between a rotary brake surface and a frictional braking member in a brake released condition that is operative to move against and frictionally retard the rotary brake surface from rotation relative thereto in a brake applied condition, said system comprising:

a source of pressurized air, conduit means operative to convey the pressurized air into an air gap between the rotary brake surface and the frictional braking member defining an air flow restriction that is a function of the clearance therebetween, an air flow sensor member operative to monitor rate of pressurized air flowing through the conduit means and provide a signal indicative of the clearance between the rotary brake surface and the frictional braking member in the brake released condition as a function of said gap restriction, and said improvement characterized by said system including, means responsive to said sensor member signal for adjusting the clearance between the frictional braking member and the rotary brake surface in the brake released condition to a predetermined desired clearance therebetween, and pulse control means operative to cause pressurized air to flow through the conduit means only in the brake released condition.

3. The system of claim 2 wherein the means for adjusting said clearance comprises a motor operably connected to the frictional braking member and operable to receive said sensor member signal and rotate in response thereto and cause the frictional braking member to move in a direction and for a distance sufficient to provide the predetermined desired clearance between the rotary brake surface and the frictional braking member in the brake released condition.

4. The system of claim 3 wherein the motor is an electrical motor and the signal provided by the sensor member is an electrical signal.

5. The system of claim 3 wherein the motor is an air motor and the sensor member signal is an air signal.

6. The system of claim 1 or 2 including warning means operably connected to the sensor member and operative to provide a warning at least when the sensor member signal indicates that the clearance between the frictional braking member and the rotary brake surface has exceeded a predetermined maximum value.

7. The system of claim 1 or 2 wherein the frictional braking member includes an opening therethrough generally transverse to the rotary brake surface and said conduit means is operative to direct the pressurized air through said opening and into the air gap without inhibiting movement of the frictional braking member between the brake applied and released conditions.

8. The system of claim 2 wherein the means for adjusting said clearance comprises a motor operably connected to the frictional braking member and operative to receive said sensor member signal and rotate in response thereto and cause the frictional braking member to move in a direction and for a distance sufficient to provide the predetermined desired clearance between the rotary brake surface and the frictional braking member in the brake released condition.

9. The system of claim 8 wherein the motor is an electrical signal and the motor is an electrical motor.

10. The system of claim 8 wherein the motor is an air motor and the signal is an air signal.

11. The system of claim 1 or 2 wherein the rotary brake surface is a vehicular rotary wheel brake surface.

* * * * *